(12) United States Patent
Carlo

(10) Patent No.: US 6,823,847 B2
(45) Date of Patent: Nov. 30, 2004

(54) METHOD OF CONTROLLING THE FUEL INJECTION PRESSURE OF AN INTERNAL COMBUSTION ENGINE COMMON RAIL INJECTION SYSTEM

(75) Inventor: Alessandro Carlo, Turin (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 10/619,752

(22) Filed: Jul. 14, 2003

(65) Prior Publication Data

US 2004/0055577 A1 Mar. 25, 2004

(30) Foreign Application Priority Data

Jul. 16, 2002 (IT) ..................................... TO2002A0619

(51) Int. Cl.$^7$ .............................................. F02M 41/00
(52) U.S. Cl. ...................................... 123/458; 123/456
(58) Field of Search ............................... 123/456, 447, 123/457, 458, 459, 463, 506

(56) References Cited

U.S. PATENT DOCUMENTS

| | | | | |
|---|---|---|---|---|
| 5,727,525 A | * | 3/1998 | Tsuzuki | 123/447 |
| 6,024,064 A | * | 2/2000 | Kato et al. | 123/179.17 |
| 6,367,452 B1 | * | 4/2002 | Shima et al. | 123/457 |
| 6,502,551 B2 | * | 1/2003 | Antonioli et al. | 123/456 |

FOREIGN PATENT DOCUMENTS

| | | |
|---|---|---|
| DE | 100 46 577 A1 | 4/2002 |
| EP | 0 802 322 A1 | 10/1997 |
| EP | 0 899 444 A2 | 3/1999 |
| EP | 1 219 827 A1 | 7/2002 |

* cited by examiner

Primary Examiner—Mahmoud Gimie
(74) Attorney, Agent, or Firm—SEED IP Law Group PLLC

(57) ABSTRACT

There is described a control method for controlling the fuel injection pressure of a common rail injection system of an internal combustion engine, the injection system having a high-pressure pump for supplying high-pressure fuel to the common rail, and for performing, at each engine cycle, a first and at least a second fuel delivery synchronously with respective fuel injections to the engine; a regulating device for regulating the fuel pressure in the common rail; and an electronic control unit supplying the regulating device with a control signal to regulate the fuel pressure in the common rail. The control method provides for determining a first value of the duty cycle of the control signal as a function of a required pressure value in the common rail, in turn a function of the power required of the engine, and as a function of an actual pressure value in the common rail; determining a second value of the duty cycle of the control signal as a function of the first value of the duty cycle, and as a function of a total correction coefficient; causing the duty cycle of the control signal to assume the first value during the first fuel delivery; and causing the duty cycle of the control signal to assume the second value during the second fuel delivery.

7 Claims, 2 Drawing Sheets

METHOD OF CONTROLLING THE FUEL INJECTION PRESSURE OF AN INTERNAL COMBUSTION ENGINE COMMON RAIL INJECTION SYSTEM

BACKGROUND OF THE INVENTION

1. Field of the Invention

The present invention relates to a method of controlling the fuel injection pressure of an internal combustion engine common rail injection system.

The present invention may be used to particular advantage, though not exclusively, in automotive applications, to which the following description refers purely by way of example.

The present invention, in fact, may also be used in so-called "no-road", i.e., non-automotive, applications to control internal combustion engines of pumps, welders, generators, etc., and more generally in any industrial application requiring the generation of mechanical power.

2. Description of the Related Art

As is known, the common rail injection systems currently installed on vehicles comprise a number of injectors for drawing high-pressure fuel, under the control of an electronic control unit, from a common rail, and injecting it into respective cylinders.

The common rail is supplied with fuel by a high-pressure mechanical, normally piston, pump, in turn supplied with fuel from the vehicle tank by a low-pressure pump. The pressure of the fuel in the common rail is controlled by a pressure regulator, which drains any surplus fuel, pumped in excess of requirements, from the common rail to keep the common rail at a given pressure, during injection, depending on the power required.

The pressure regulator normally comprises a solenoid valve, i.e., a valve controlled by an electromagnet, which, when closed, allows supply to the common rail of all the fuel pumped by the high-pressure pump, and, when partly or fully open, drains the surplus fuel from the common rail along a drain conduit into the tank.

More specifically, the solenoid valve comprises a shutter, which is kept closed by a spring when the electromagnet is deenergized, and which is kept open when the electromagnet is energized. More specifically, the electromagnet is driven by the electronic control unit by means of a control signal, the duty cycle of which determines the extent to which the electromagnet is energized, and therefore the extent to which the shutter is opened.

Since, in common rail injection systems currently installed on vehicles, the high-pressure pump is a continuous-delivery pump not timed with the engine, i.e., a pump activated, for example, by a cam, to supply fuel substantially continuously to the common rail, whereas the injectors are activated at a given stroke in the engine cylinder cycle, the high-pressure pump must be designed to ensure maximum fuel draw by the injectors as a whole during the engine cycle.

European Patent Application 01130851.7—filed by the present applicant on 27, Dec. 2001, published on 3, Jul. 2002 under number EP-1219827, and claiming priority over Italian Patent Application TO2000A01228 of 29, Dec. 2000—recently proposed a special common rail injection system configuration which can also be fitted to old-type diesel engines, in which, as is known, the injectors are supplied directly by a high-pressure pump whose delivery is discontinuous, timed with the engine, and cyclically constant, i.e., a pump operated synchronously, i.e., pumping in time with the injectors.

More specifically, the above patent application describes a high-pressure pump comprising one or more pumping elements, each having a cylinder and a piston, which is activated by a corresponding cam to pump in time with the relative injector to appropriately control fuel pressure variations in the common rail. The cams are rotated by the engine, and more specifically are carried by a pump drive shaft preferably defined by an engine shaft performing other functions, such as the shaft operating the cylinder intake and exhaust valves, or the drive shaft itself.

In the case of a high-pressure pump with one pumping element, the piston is controlled by a cam shaped to produce a number of axial movements of the piston inside the cylinder, and so produce a number of fuel deliveries to the common rail at each engine cycle.

In some applications, the high-pressure pump piston is controlled by an asymmetrical cam, i.e., a cam shaped to produce a number of different axial movements of the piston inside the cylinder.

FIG. 1 shows an example of the movement of the high-pressure pump piston at each engine cycle as a function of the asymmetrical cam profile. More specifically, FIG. 1 relates to fuel supply to a two-cylinder engine by a high-pressure pump with one pumping element, and wherein two fuel injections, one per cylinder, are made at each engine cycle.

It should be pointed out that further injections per cylinder can be made by drawing directly from the fuel in the rail, which remains pressurized even in the absence of delivery.

As can be seen, during the engine cycle, the cam produces a first and a second axial movement of the piston inside the cylinder, to produce a first and a second fuel delivery to the common rail, so that the fuel in the rail is brought to a given required pressure value $P_R$ at the instants in which fuel is injected into the first and second cylinder respectively.

As shown in FIG. 1, a drawback of common rail injection systems of the above type lies in the fuel pressure in the common rail during the second delivery reaching, at the instant of synchronism, a different (typically higher) value with respect to the required pressure value $P_R$ due to dispersion.

The amount of fuel, in fact, in the high-pressure pump at the start of the second delivery is less than at the start of the first delivery, and the geometric effect of the reduction in volume inside the cylinder, as the piston advances along the cylinder, produces a greater increase in pressure at the second delivery, on account of the elastic fuel volumes on which compression is exerted being smaller than at the start of the first delivery.

This difference in fuel pressure in the common rail during deliveries after the first has various negative effects on both consumption and engine emissions.

BRIEF SUMMARY OF THE INVENTION

It is an object of the present invention to provide a method of controlling the fuel injection pressure of an internal combustion engine common rail injection system, designed to eliminate the aforementioned drawbacks.

According to the present invention, there is provided a method of controlling the fuel injection pressure of an internal combustion engine common rail injection system, as claimed in claim 1.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
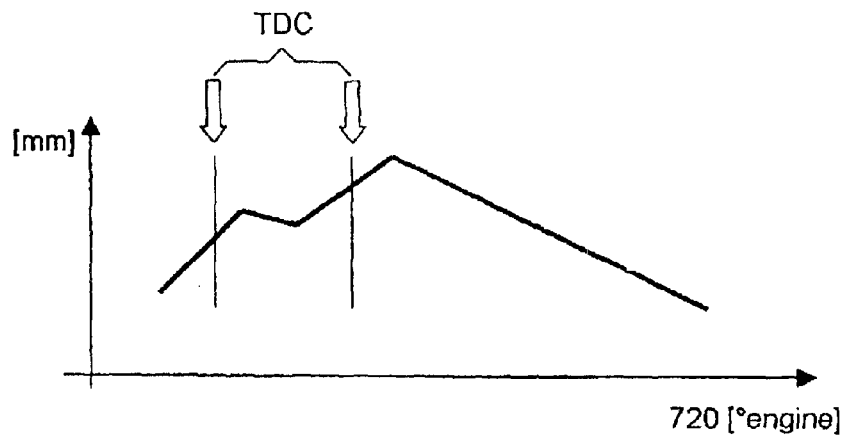
FIG. 1 shows, schematically, the piston movement of a common rail injection system high-pressure pump.
Figure 2:
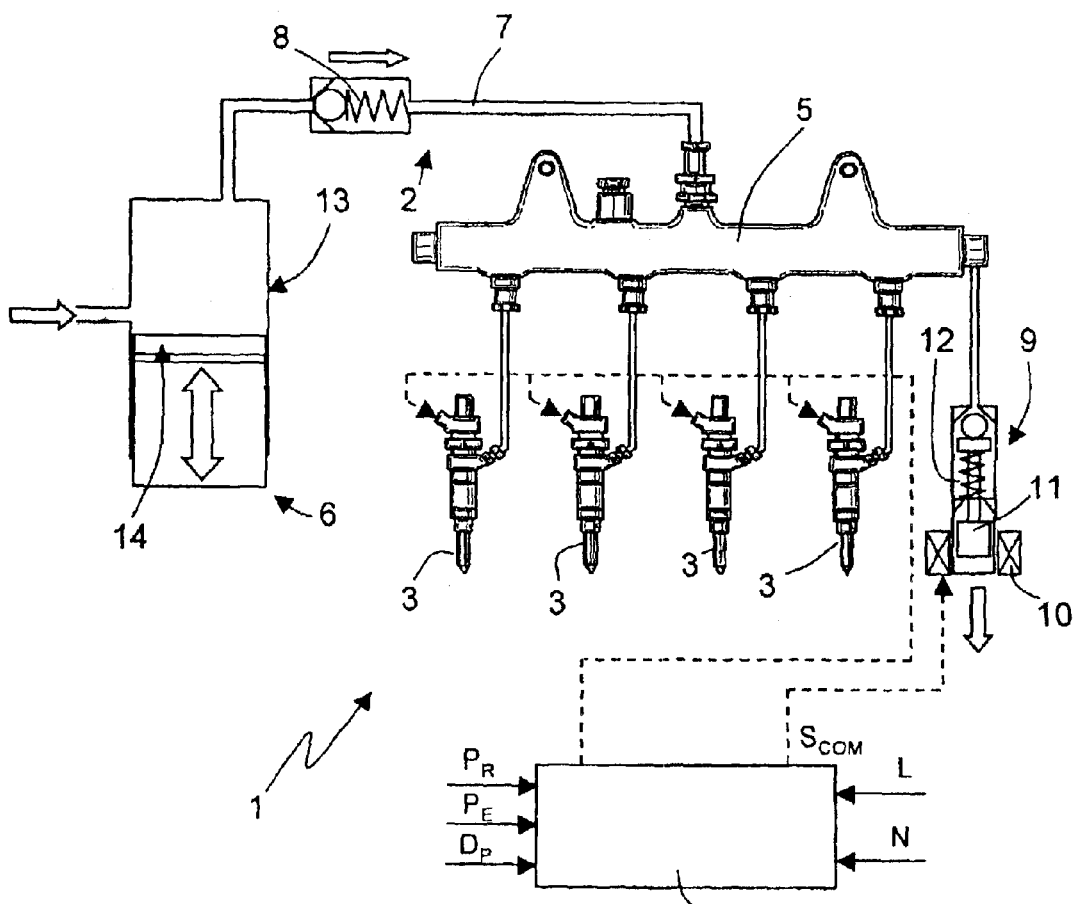
FIG. 2 shows, schematically, a system for controlling the fuel injection pressure of an internal combustion engine common rail injection system in accordance with the teachings of the present invention.

Number 1 in FIG. 2 indicates as a whole a system for controlling the fuel injection pressure of an internal combustion engine common rail injection system 2.

For the sake of simplicity, the following description refers to a two-cylinder engine, though what is stated also applies to engines with any number of cylinders timed with one another.

Injection system 2 comprises a first and a second injector 3 for drawing high-pressure fuel, under the control of an electronic control unit 4, from a common rail 5, and injecting it into respective cylinders.

Injection system 2 also comprises a mechanical high-pressure pump 6, which is supplied with low-pressure fuel from the tank by a low-pressure pump (not shown), and supplies high pressure fuel to common rail 5 along a delivery conduit 7 fitted with a one-way valve 8 preferably, though not necessarily, integrated in pump 6.

Injection system 2 also comprises a pressure regulator 9 connected to common rail 5, and which drains any surplus fuel, pumped in excess of requirements, from the common rail to keep the common rail at a given pressure, during injection, depending on the power required.

Pressure regulator 9 comprises a solenoid valve 10, i.e., a valve controlled by an electromagnet, which, when closed, allows supply to common rail 5 of all the fuel pumped by high-pressure pump 6, and, when partly or fully open, drains the surplus fuel from common rail 5.

More specifically, solenoid valve 10 comprises a shutter 11, which is kept closed by a spring 12 when the electromagnet is deenergized, and which, when the electromagnet is energized, is kept open by a force equal to the difference between the preload force of the spring and the contrasting force produced by a control signal $S_{COM}$ generated by electronic control unit 4. More specifically, the electromagnet is driven by electronic control unit 4 by means of power control signal $S_{COM}$, the duty cycle DC of which determines the extent to which the electromagnet is energized, and therefore the resulting preload of shutter 11.

High-pressure pump 6 is a discontinuous pump operated synchronously, i.e., pumping in time with each injector 3, so as to deliver fuel during injection by each injector, to minimize fuel pressure variations in common rail 5 and prevent pressure collapsing as a result of injection.

In the example shown, high-pressure pump 6 has one pumping element, i.e., comprises a cylinder 13, and a piston 14 mounted to slide axially inside cylinder 13 to produce a number of fuel deliveries to common rail 5 at each engine cycle.

Piston 14 is operated by an asymmetrical cam (not shown) rotated by the engine and shaped to produce a number of axial movements of piston 14 inside cylinder 13, and a first and at least a second fuel delivery to common rail 5 at each engine cycle.

Figure 3:
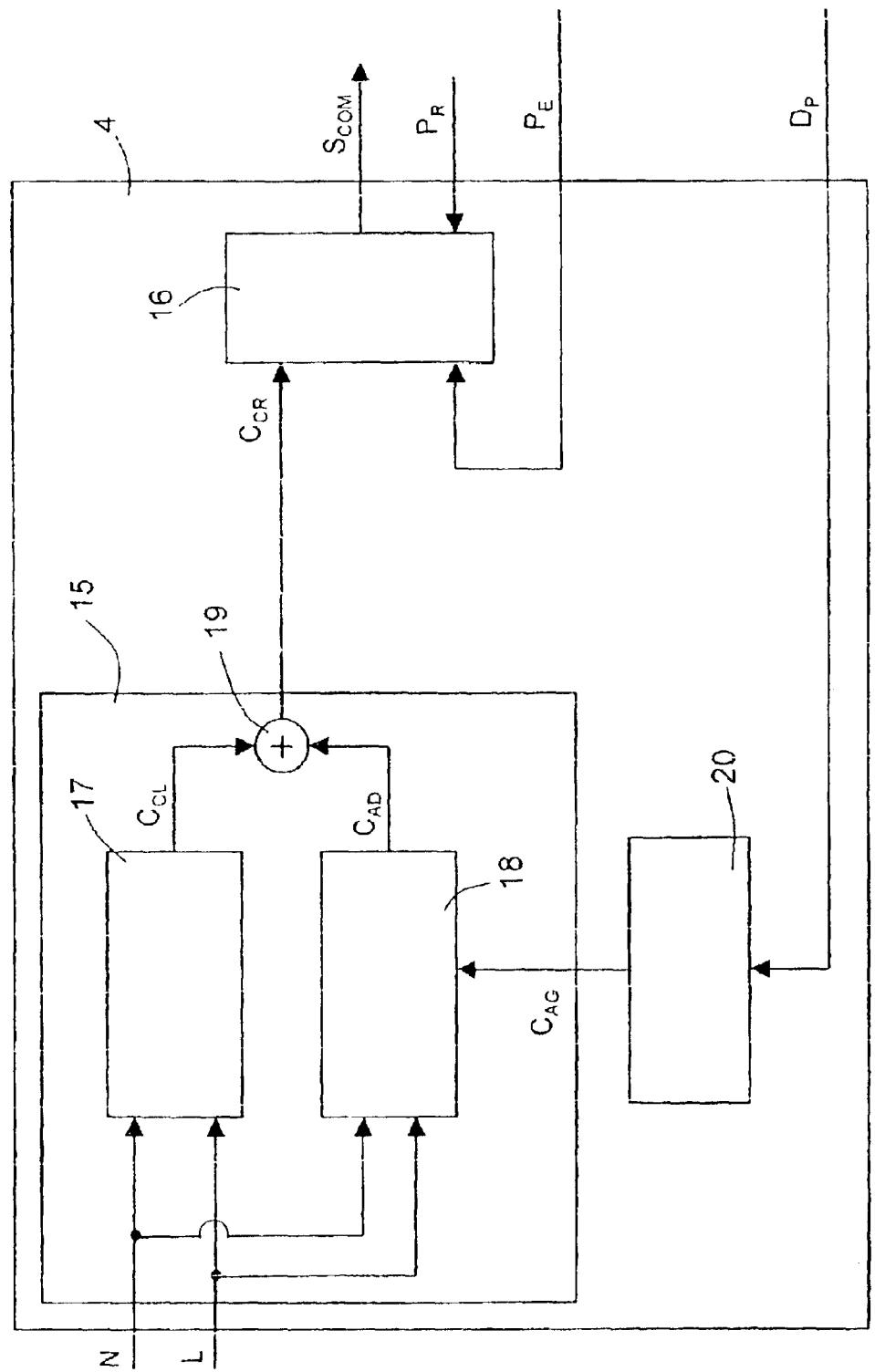
FIG. 3 shows a block diagram illustrating the operations performed by an electronic control unit for controlling the fuel injection pressure of an internal combustion engine common rail injection system.

With reference to FIGS. 2 and 3, the electronic control unit operates on the basis of engine parameters measured on the engine by appropriate sensors (not shown), and on the basis of operating parameters of injection system 2, to supply control signal $S_{COM}$, the duty cycle DC of which determines the equivalent preload of pressure regulator 9 and so regulates the pressure in common rail 5.

More specifically, for each engine cycle and as described in detail later on, electronic control unit 4 determines the duty cycle DC of control signal $S_{COM}$ synchronously with each fuel delivery by high-pressure pump 6 and as a function of the following parameters: engine speed N; engine load L; the required pressure $P_R$ in common rail 5 during each delivery, which depends on the power required of the engine; the actual pressure $P_E$ in common rail 5 during each delivery; and the fuel pressure difference $D_P$ in common rail 5 between the first and second fuel delivery by high-pressure pump 6.

In the example shown, pressure difference $D_P$ is defined by the difference between the final fuel pressure value in common rail 5 during the second delivery, and the final fuel pressure value in common rail 5 during the first delivery.

With reference to FIG. 3, electronic control unit 4—of which only the parts required for a clear understanding of the present invention are shown—comprises a correction block 15, which receives the so-called engine point defined by engine speed N and engine load L, and supplies a total correction coefficient $C_{CR}$.

Electronic control unit 4 also comprises a control block 16, which receives the required pressure $P_R$ and actual pressure $P_E$ in common rail 5, and total correction coefficient $C_{CR}$, and supplies control signal $S_{COM}$ for controlling pressure regulator 9.

More specifically, the control signal $S_{COM}$ supplied by control block 16 has a duty cycle DC which, during the first delivery by high-pressure pump 6, is calculated as a function of the difference between the required pressure $P_R$ and actual pressure $P_E$ in common rail 5 to bring the actual pressure $P_E$ to the same value as the required pressure $P_R$, and which, during the second delivery by high-pressure pump 6, is corrected as a function of total correction coefficient $C_{CR}$ supplied by correction block 15, so as to adjust the actual pressure $P_E$ generated during the second delivery in common rail 5 to the required pressure $P_R$ value, and so eliminate the pressure difference $D_P$ between the first and second delivery.

With reference to FIG. 3, correction block 15 substantially comprises a static correction block 17, which receives engine speed N and engine load L, and supplies a static correction coefficient $C_{CL}$; and an adaptive correction block 18, which receives engine speed N, engine load L, and an adaptive update coefficient $C_{AG}$ explained in detail later on, and supplies an adaptive correction coefficient $C_{AD}$.

Correction block 15 also comprises an adding block 19, which receives adaptive correction coefficient $C_{AD}$ and static correction coefficient $C_{CL}$, and supplies total correction coefficient $C_{CR}$, i.e., $C_{CR}=C_{AD}+C_{CL}$.

More specifically, static correction block 17 stores an electronic static correction map containing a static correction coefficient $C_{CL}$ for each engine point defined by a respective pair of engine speed N and load L values.

More specifically, the electronic static correction map is defined by a two-dimensional matrix, each box of which is identifiable by a respective pair of engine speed N and load L values, and contains a respective static correction coefficient $C_{CL}$ value determined experimentally at an initial calibration stage of the injection system.

In the example shown, the static correction coefficient $C_{CL}$ value indicates the nominal correction, as a percentage value, to be made to duty cycle DC of control signal $S_{COM}$ during the second delivery to eliminate the pressure difference $D_P$ between the first and second delivery.

Adaptive correction block 18, on the other hand, stores an electronic adaptive correction map containing an adaptive correction coefficient $C_{AD}$ for each engine point defined by a respective pair of engine speed N and load L values.

More specifically, the electronic adaptive correction map is defined by a two-dimensional matrix, each box of which is identifiable by a respective pair of input parameters (engine speed N and load L), and contains a respective adaptive correction coefficient $C_{AD}$ value.

In the example shown, the adaptive correction coefficient $C_{AD}$ value indicates the correction to be made to duty cycle DC of control signal $S_{COM}$ to take into account the deviation of the injection system and engine from nominal conditions, as a result, for example, of injection system and engine component part ageing or other factors.

With reference to FIG. 3, electronic control unit 4 also comprises an update block 20, which receives pressure difference $D_P$, and supplies adaptive update coefficient $C_{AG}$, which is determined according to the equation:

$$C_{AG}=(D_P/K_P)*K_R$$

where $K_P$ represents a pressure gain indicating the variation in fuel pressure in common rail 5 alongside a variation in duty cycle DC of control signal $S_{COM}$. For example, pressure gain $K_P$ may indicate the variation in fuel pressure in common rail 5 alongside a predetermined variation in duty cycle DC, eg., one percent of duty cycle DC of control signal $S_{COM}$.

$K_R$ is a numerical relaxation term of predetermined value. In the example shown, relaxation term $K_R$ is so established as to allow electronic control unit 4 to complete correction of control signal $S_{COM}$ in a predetermined number of engine cycles, while at the same time ensuring correct operation, even in the event of errors in determining pressure difference $D_P$ or estimating the value of gain $K_P$. The value of relaxation term $K_R$ may preferably, though not necessarily, range between 0.1 and $10^{-4}$.

Adaptive update coefficient $C_{AG}$ is used by adaptive correction block 18 to update the electronic adaptive correction map to take into account the deviation of injection system 2 and the engine from nominal conditions.

In the example shown, the adaptive correction coefficients $C_{AD}$ stored in the electronic adaptive correction map are updated each time by electronic control unit 4 as a function of the updated adaptive update coefficient $C_{AG}$ value and of the engine point, i.e., engine speed N and load L.

More specifically, the adaptive correction coefficients $C_{AD}$ stored in the electronic adaptive correction map are preferably, though not necessarily, updated when the engine is running steadily, i.e., when, for example, engine speed N remains within a given range for a given time, and the temperature of the engine is above a given threshold.

For this purpose, the adaptive correction coefficients $C_{AD}$ in the two-dimensional matrix are constantly updated as a function of the updated adaptive update coefficient $C_{AG}$ by means of a known linear interpolation operation. For example, the adaptive correction coefficients $C_{AD}$ may be updated each time over a number of boxes in the two-dimensional matrix, as a function of the engine point, i.e., load L and speed N. In the example shown, the new value assigned to each said box may be determined by linearly weighting the adaptive update coefficient $C_{AG}$ as a function of the proximity of the current engine point (L, N) with respect to the engine points of the boxes.

Operation of electronic control unit 4 will now be described, assuming high-pressure pump 6 effects a first and second fuel delivery to common rail 5 in the same engine cycle and in time with fuel injection into the first and second cylinder respectively.

In time with the first delivery and as a function of required pressure $P_R$ and actual pressure $P_E$, control block 16 of electronic control unit 4 determines the duty cycle $DC_1$ of control signal $S_{COM}$ to be supplied to pressure regulator 9 to bring the pressure in common rail 5 to the same value as required pressure $P_R$.

Once the first delivery is completed, high-pressure pump 6 effects the second delivery in time with injection into the second cylinder, and control block 16 corrects the duty cycle $DC_1$ of control signal $S_{COM}$ to pressure regulator 9 as a function of total correction coefficient $C_{CR}$.

In the example shown, during the second delivery and as a function of the engine point (N, L), static correction block 17 and adaptive correction block 18 respectively supply static correction coefficient $C_{CL}$ and adaptive correction coefficient $C_{AD}$, which are added in adding block 19, which in turn supplies total correction coefficient $C_{CR}$ to correction block 16.

When the engine is running steadily, electronic control unit 4 also provides for updating the electronic adaptive correction map stored in adaptive correction block 18 and containing adaptive correction coefficients $C_{AD}$.

At this step, update block 20 acquires the pressure difference $D_P$ between the first and second delivery made in the last engine cycle, and processes pressure difference $D_P$ to determine the adaptive update coefficient $C_{AG}$ to supply to adaptive correction block 18, which, as a function of the engine point (N, L), updates the boxes in the two-dimensional matrix of the electronic adaptive correction map.

As will be clear from the foregoing description, the above method also applies in the event high-pressure pump 6 performs more than two fuel deliveries to common rail 5 at each engine cycle.

In which case, during each delivery following the first, control block 16 corrects the duty cycle $DC_1$ of the control signal $S_{COM}$ calculated for the first delivery, by means of a total correction coefficient $C_{CR}$ calculated by a correction block 15 relative to the delivery in question.

The pressure control method may obviously be applied both to injection systems performing a number of fuel injections into the same cylinder at each engine cycle, and to injection systems performing, at each engine cycle, a sequence of individual injections into a number of respective cylinders.

The control method described has the advantage of ensuring the same fuel pressure in the common rail during each delivery made by the high-pressure pump at each engine cycle, thus improving the stability and reducing the consumption and emissions of the engine.

By constantly updating the adaptive correction coefficients $C_{AD}$ in the adaptive correction map, the control method also has the big advantage of providing for extremely "vigorous" pressure control, i.e., independent of variations in characteristic injection system and engine parameters, caused, for example, by ageing of injection system and/or engine component parts.

Clearly, changes may be made to the control method as described and illustrated herein without, however, departing from the scope of the present invention.

What is claimed is:

1. A control method for controlling the fuel injection pressure of a common rail injection system of an internal combustion engine, said injection system comprising delivery means for supplying fuel under pressure to the common rail of said injection system, and for performing, at each engine cycle, a first and at least a second fuel delivery synchronously with respective fuel injections into said engine; a regulating device for regulating the fuel pressure in said common rail; and control means supplying said regulating device with a control signal to regulate the fuel pressure in said common rail; said control method being characterized by comprising the steps of:

determining a first value of a characteristic parameter of said control signal as a function of a required pressure value and of an actual pressure value in said common rail;

determining a second value of the characteristic parameter of said control signal as a function of said first value of the characteristic parameter, and as a function of a total correction coefficient;

causing the characteristic parameter of the control signal supplied to said regulating device to assume said first value during said first fuel delivery; and causing the characteristic parameter of the control signal supplied to said regulating device to assume said second value during said second fuel delivery.

2. A control method as claimed in claim 1, characterized in that said characteristic parameter of said control signal is the duty cycle.

3. A control method as claimed in claim 1, characterized by comprising the steps of:

generating a static correction map containing a number of static correction coefficients, each relating to a respective engine operating point;

generating an adaptive correction map containing a number of adaptive correction coefficients, each relating to a respective engine operating point; and determining the total correction coefficient for the current engine operating point as a function of the static correction coefficient and adaptive correction coefficient stored in said maps and relating to the same engine operating point.

4. A control method as claimed in claim 3, characterized in that said step of determining said total correction coefficient comprises the step of adding the relative static correction coefficient and the relative adaptive correction coefficient.

5. A control method as claimed in claim 3, characterized by comprising the step of updating said adaptive correction map as a function of the difference between the fuel pressure in said common rail after said second fuel delivery, and the fuel pressure in said common rail after said first fuel delivery.

6. A control method as claimed in claim 5, characterized in that said step of updating said adaptive correction map comprises the steps of:

generating an adaptive update coefficient relating to the current engine operating point as a function of said difference in pressure; and updating the adaptive correction coefficient in said adaptive correction map relating to the same operating point of the engine as a function of said adaptive update coefficient.

7. A control method as claimed in claim 1, wherein the delivery means effect further fuel deliveries to the common rail in each engine cycle and in time with fuel injection to the engine; said control method being characterized by also comprising the steps of:

determining, for each said further delivery and as a function of the operating point of the engine, a respective total correction coefficient of the value of the characteristic parameter of the control signal calculated for the preceding delivery;

modifying, for each further delivery and as a function of the respective total correction coefficient, the value of the characteristic parameter of the control signal calculated for the preceding delivery, to generate a number of second values of the characteristic parameter of the control signal, one for each fuel delivery;

supplying said regulating device, during each of said further deliveries by said delivery means, with a control signal whose characteristic parameter assumes the relative said second value.

* * * * *